United States Patent [19]
Chen et al.

[11] Patent Number: 6,148,350
[45] Date of Patent: Nov. 14, 2000

[54] SYSTEM FOR ALLOCATING AN INTEGER UNIT OF MEMORY GREATER THAN A REQUESTED SIZE AND FILLING THE EXTRA SPACE DUE TO DIFFERENCE IN SIZES WITH EXTRANEOUS DATA

[75] Inventors: Edmund Chen, Sunnyvale; Claude Hayek, Mountain View; Jahan Lotfi, Fremont, all of Calif.

[73] Assignee: 3Com Corporation, Santa Clara, Calif.

[21] Appl. No.: 09/087,345

[22] Filed: May 29, 1998

[51] Int. Cl.⁷ ..................................................... G06F 13/14
[52] U.S. Cl. .............................. 710/62; 710/26; 710/103; 712/300; 713/224; 713/228
[58] Field of Search .................................. 710/62, 103, 3, 710/26; 713/300; 712/224, 228

[56] References Cited

U.S. PATENT DOCUMENTS

| | | | |
|---|---|---|---|
| 5,535,352 | 7/1996 | Bridges et al. ........................... | 711/208 |
| 5,651,136 | 7/1997 | Denton et al. ........................... | 711/118 |
| 5,859,999 | 1/1999 | Morris et al. ........................... | 712/224 |
| 5,943,482 | 8/1999 | Culley et al. ........................... | 361/798 |

*Primary Examiner*—Thomas C. Lee
*Assistant Examiner*—Abdelmoniem Elamin
*Attorney, Agent, or Firm*—Wagner Murabito&Hao LLP

[57] ABSTRACT

A method and system for efficiently transferring data between a host computer and a peripheral component which is removably coupled to the host computer. In one embodiment of the present invention, a peripheral component driver such as, for example, a network interface card driver receives a request from a peripheral component, such as, for example, a network interface card, to transfer data from the peripheral component to memory of the host computer. The data to be transferred requires a first block of memory in the host computer wherein the first block of the memory has a first size. The present embodiment then allocates a second block of memory in the host computer to receive the data from the peripheral component. In the present invention, the second block of memory has a second size which is greater than the first size. Additionally, the second block of memory comprises an integer unit of the memory. In so doing, the present invention minimizes CPU overhead associated with data transfers between a peripheral component and the memory of a host computer. The present invention also reduces latency associated with data transfers between a peripheral component and the memory of a host computer.

18 Claims, 8 Drawing Sheets

SYSTEM FOR ALLOCATING AN INTEGER UNIT OF MEMORY GREATER THAN A REQUESTED SIZE AND FILLING THE EXTRA SPACE DUE TO DIFFERENCE IN SIZES WITH EXTRANEOUS DATA

TECHNICAL FIELD

The present invention generally pertains to the field of computer networking. More particularly, the present invention is related to the ability of a peripheral component to access and store data into cache memory of a host computer device.

BACKGROUND ART

Computers have become an integral tool used in a wide variety of different applications, such as in finance and commercial transactions, computer-aided design and manufacturing, health-care, telecommunication, education, etc. Computers are finding new applications as a result of advances in hardware technology and rapid development in software technology. Furthermore, a computer system's functionality is dramatically enhanced by coupling stand-alone computers together to form a computer network. In a computer network, users may readily exchange files, share information stored on a common database, pool resources, and communicate via e-mail and via video teleconferencing.

One popular type of computer network is known as a local area network (LAN). LANs connect multiple computers together such that the users of the computers can access the same information and share data. Typically, in order to be connected to a LAN, a general purpose computer requires an expansion board generally known as a network interface card (NIC). Essentially, the NIC works with the operating system and central processing unit (CPU) of the host computer to control the flow of information over the LAN. Some NICs may also be used to connect a computer to the Internet.

Much of a computer system's functionality and usefulness to a user is derived from the functionality of the peripheral devices. For example, the speed and responsiveness of the graphics adapter is a major factor in a computer system's usefulness as an entertainment device. Or, for example, the speed with which video files can be retrieved from a hard drive and played by the graphics adapter determines the computer system's usefulness as a training aid. Hence, the rate at which data can be transferred among the various peripheral devices often determines whether the computer system is suited for a particular purpose. The electronics industry has, over time, developed several types of bus architectures. Recently, the PCI (peripheral component interconnect) bus architecture has become one of the most widely used, widely supported bus architectures in the industry. The PCI bus was developed to provide a high speed, low latency bus architecture from which a large variety of systems could be developed.

Prior Art FIG. 1 shows a typical PCI bus architecture 100. PCI bus architecture 100 is comprised of a CPU 102, main memory 104, cache memory 105 all of which are coupled to a host PCI bridge containing arbiter 106 (hereafter arbiter 106) through a CPU local bus 108 and memory buses 110a and 110b, respectively. A PCI bus 112 is coupled to arbiter 106, and PCI bus 112 is further coupled to each of plurality of PCI agents 114, 116, 118, 120, 122, 124. Note that peripheral component 124 of Prior Art FIG. 1 is a NIC.

Referring still to Prior Art FIG. 1, each of PCI agents 114, 116, 118, 120, 122, 124 (hereafter, PCI agents 114–124) residing on PCI bus 112 use PCI bus 112 to transmit and receive data. PCI bus 112 is comprised of functional signal lines, for example, interface control lines, address/data lines, error signal lines, and the like. Each of PCI agents 114–124 are coupled to the functional signal lines comprising PCI bus 112. When one of PCI agents 114–124 requires the use of PCI bus 112 to transmit data, it requests PCI bus ownership from arbiter 106. The PCI agent requesting ownership is referred to as an "initiator", or bus master. Upon being granted ownership of PCI bus 112 from arbiter 106, the initiator (e.g., PCI agent 116) carries out its respective data transfer.

Each of PCI agents 114–124 may independently request PCI bus ownership. Thus, at any given time, several of PCI agents 114–124 may be requesting PCI bus ownership simultaneously. Where there are simultaneous requests for PCI bus ownership, arbiter 106 arbitrates between requesting PCI agents to determine which requesting PCI agent is granted PCI bus ownership. When one of PCI agents 114–124 is granted PCI bus ownership, it initiates it transaction (e.g., data transfer) with a "target" or slave device (e.g., main memory 104). When PCI agent relinquishes ownership of the PCI bus, arbiter 106 is able to reassign PCI bus 112 to another requesting PCI agent.

Thus, only one data transaction can take place on a PCI bus at any given time. In order to maximize the efficiency and data transfer bandwidth of PCI bus 112, PCI agents 114–124 follow a definitive set of protocols and rules. These protocols are designed to standardize the method of accessing, utilizing, and relinquishing PCI bus 112, so as to maximize its data transfer bandwidth. The PCI bus protocols and specifications are set forth in an industry standard PCI specification (e.g., PCI Specification—Revision 2.1). Where each of PCI agents 114–124 are high performance, well designed devices, data transfer rates of up to 528 Mbytes per second can be achieved (e.g., PCI bus 112 operating at 66 MHz and 64 bits wide).

The NIC, like other peripheral component devices, requires a device driver which controls the physical functions of the NIC and coordinates data transfers between the NIC and the host operating system. An industry standard for interfacing between the device driver and the host operating system is known as the Network Device Interface Specification, or NDIS, which is developed by Microsoft Corporation of Redmond, Washington. The operating system layer implementing the NDIS interface is generally known as an NDIS wrapper. Functionally, the NDIS wrapper arbitrates the control of the device driver between various application programs and provides temporary storage for the data packets.

During typical operation, NIC 124 will need to access (e.g. write data into) memory space of the host computer. In order perform such an operation, NIC 124 must obtain access to and utilize PCI bus 112. This process is sometimes referred to as "getting on the bus". Once on the bus, a conventional NIC will write the necessary data into cache memory space previously allocated to the NIC. Memory space is allocated to the NIC by the NIC driver operating in combination with operating system of the host computer.

In Prior Art systems, when writing to the cache, the NIC will typically perform either a Memory Write operation (MW), a Memory Write and Invalidate operation (MWI), or a combination of MW and MWI operations. When the transfer of data does not start on a cache line boundary or does not end on a cache line boundary a MW operation is used. On the other hand, a MWI operation, is used when the transfer of data from the peripheral component (e.g. NIC 124) starts on a cache line boundary and ends on a cache line boundary. Additionally, in order to use the MWI operation, all of the byte enables must always be asserted, thereby indicating that all bytes are in the cache line are being written.

Several benefits are associated with the MWI operation. For example, in many PCI-based systems, the MWI operation provides for bursting of significant amounts of data (enough data to occupy at least one cache line) from the NIC to the cache. Furthermore, because the NIC is writing to an entire cache line, the MWI operation invalidates all data in the allocated cache line(s). Hence, the memory subsystem of the host computer is informed that the data in that cache line is invalid. Therefore, the memory subsystem of the host computer does not need to check and/or update that particular line of the cache and write it back to main memory. As a result, CPU utilization is reduced. Additionally, the MWI operation is able to write to multiple lines of the cache memory without relinquishing control of the bus. Unfortunately, as stated above, the MWI operation can only be used when the transfer of data from the NIC starts on a cache line boundary and ends on a cache line boundary.

Therefore, commonly, data transfers from a peripheral component to the cache of the host computer are performed using both a MW and a MWI operation. For example, data starting on a cache line boundary and ending on a cache line boundary is transferred using the MWI operation. Remaining data to be transferred, which does not start or end on a cache line boundary, is then transferred using the MW operation. However, in order to transition from one operation to another (e.g. MWI to MW, or from MW to MWI), the peripheral component must relinquish ownership of the bus (this process is sometimes referred to as "getting off the bus"), and then regain access to and control of the bus. Although the peripheral component is writing data to memory space of the host computer, for cache coherency purposes, the system must update any modified bits in the cache memory to main memory. By using the MWI operation, this updating process does need to be performed.

In one example of a conventional operation, a first portion of data to be placed in the memory of the host computer system is transferred from the peripheral component to the cache using a MWI operation. After the first portion of the data has been transferred, the peripheral component gets off the bus. Once off the bus, the peripheral component must then get back on the bus again in order to transfer the remaining/second portion of the data using the MW operation. However, even if no other components are requesting access to the bus, several clock cycles of latency are associated with requesting and being granted ownership of the bus. If other peripheral components are requesting or have been granted ownership of the bus, it may be an extended period of time before the original peripheral component is able to perform the MW operation and complete the transfer of the second portion of the data to the cache.

Thus, a need exists for a system and method which provides for a more efficient transfer of data between a peripheral component and the cache memory of a host computer system. A need also exists for a system and method which minimizes the CPU overhead associated with data transfers between a peripheral component and the cache memory of a host computer system. Still another need exists for a system and method which reduces the latency associated with data transfers between a peripheral component and the cache memory of a host computer system.

DISCLOSURE OF THE INVENTION

The present invention provides a system and method which provides for a more efficient transfer of data between a peripheral component and the cache memory of a host computer system. The present invention also provides a system and method which minimizes the CPU overhead associated with data transfers between a peripheral component and the cache memory of a host computer system. The present invention further provides a system and method which reduces the latency associated with data transfers between a peripheral component and the cache memory of a host computer system. The above accomplishments are achieved with a system and method employing a memory write and invalidate overwrite (MWIO) operation for transferring data from a peripheral component to the cache of a host computer system.

Specifically, in one embodiment of the present invention, a peripheral component driver such as, for example, a network interface card driver receives a request from a peripheral component, such as, for example, a network interface card, to transfer data from the peripheral component to memory of the host computer. The data to be transferred requires a first block of memory in the host computer wherein the first block of the memory has a first size. The present embodiment then allocates a second block of memory in the host computer to receive the data from the peripheral component. In the present invention, the second block of memory has a second size which is greater than the first size. Additionally, the second block of memory comprises an integer unit of the memory. In so doing, the present invention minimizes CPU overhead associated with data transfers between a peripheral component and the memory of a host computer. The present invention also reduces latency associated with data transfers between a peripheral component and the memory of a host computer.

In another embodiment, the present invention includes the steps of the above-described embodiment and includes additional steps. Specifically, the present embodiment further performs the steps of receiving, in the second block of memory, the data from the peripheral component. The present invention also recites filling extra memory space present in the second block of memory, due to the difference in size between the first size and the second size, with extraneous data.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Figure 1:
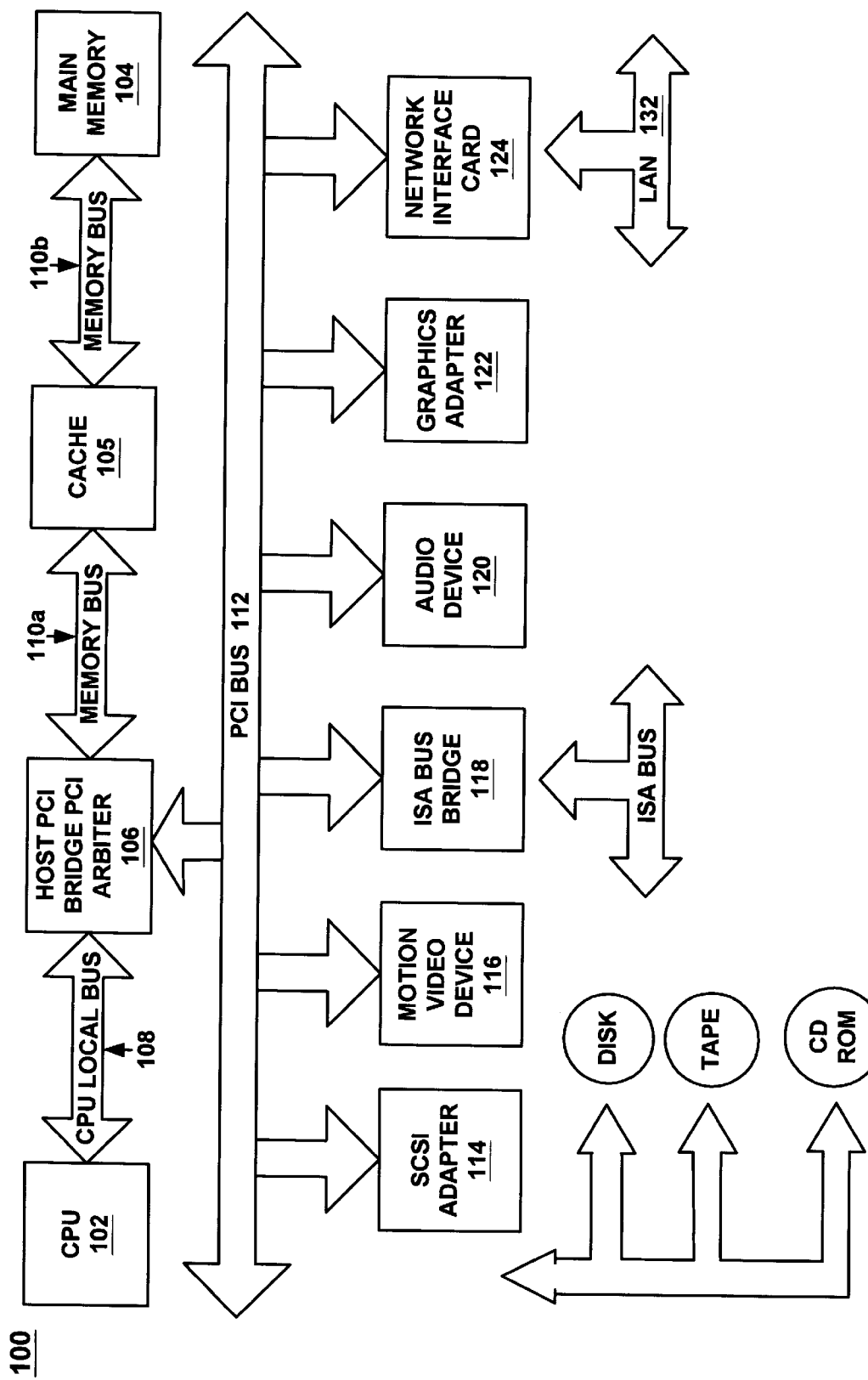
FIG. 1 is a schematic diagram of a typical PCI bus architecture.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present memory write and invalidate overwrite (MWIO) invention, discussions utilizing terms such as "receiving", "allocating", "requesting", "using" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present MWIO invention is also well suited to the use of other computer systems such as, for example, optical and mechanical computers.

COMPUTER SYSTEM ENVIRONMENT OF THE PRESENT MWIO INVENTION

Figure 2:
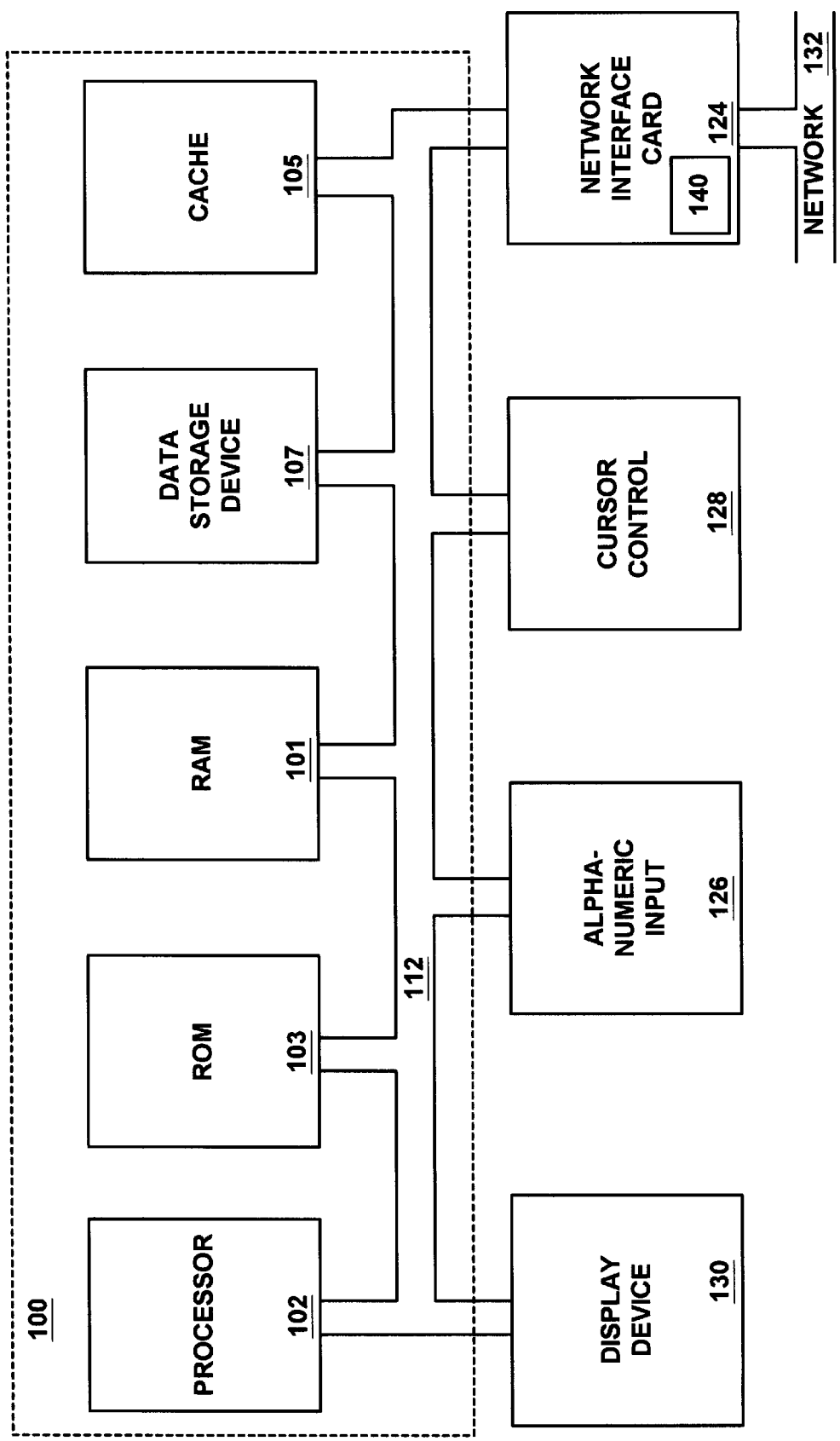
FIG. 2 is a schematic diagram of an exemplary computer system used to perform steps of the present MWIO method in accordance with one embodiment of the present invention.

With reference now to FIG. 2, portions of the present MWIO method and system are comprised of computer-readable and computer-executable instructions which reside, for example, in computer-usable media of a computer system. FIG. 2 illustrates an exemplary computer system 100 in more detail than is shown in Prior Art FIG. 1. The computer system 100 is used in combination with a peripheral component to perform the MWIO method in accordance with one embodiment of the present invention. It is appreciated that system 100 of FIG. 2 is exemplary only and that the present invention can operate within a number of different computer systems including general purpose networked computer systems, embedded computer systems, and stand alone computer systems. Additionally, computer system 100 of FIG. 2 is well adapted having computer readable media such as, for example, a floppy disk, a compact disc, and the like coupled thereto. Such computer readable media is not shown coupled to computer system 100 in FIG. 2 for purposes of clarity.

System 100 of FIG. 2 includes a PCI address/data bus 112 for communicating information, and a central processor unit 102 coupled to bus 112 for processing information and instructions. Central processor unit 102 may be an 80×86-family microprocessor. System 100 also incudes data storage features such as a computer usable volatile memory 101, e.g. random access memory (RAM), coupled to bus 112 for storing information and instructions for central processor unit 102, computer usable non-volatile memory 103, e.g. read only memory (ROM), and cache memory 105 coupled to bus 112 for storing static information and instructions for the central processor unit 102, and a data storage unit 107 (e.g., a magnetic or optical disk and disk drive) coupled to bus 112 for storing information and instructions. It will be understood that in some embodiments, ROM 103, RAM 101, cache memory 105, and data storage unit 107, or some combination thereof, will comprise main memory 104 of Prior Art FIG. 1. System 100 of the present invention also includes an optional alphanumeric input device 126 including alphanumeric and function keys is coupled to bus 112 for communicating information and command selections to central processor unit 102. System 100 also optionally includes a cursor control device 128 coupled to bus 112 for communicating user input information and command selections to central processor unit 102. System 100 of the present embodiment also includes an optional display device 130 coupled to bus 112 for displaying information.

Referring still to FIG. 2, optional display device 130 of FIG. 2, may be a liquid crystal device, cathode ray tube, or other display device suitable for creating graphic images and alphanumeric characters recognizable to a user. Optional cursor control device 128 allows the computer user to dynamically signal the two dimensional movement of a visible symbol (cursor) on a display screen of display device 130. Many implementations of cursor control device 128 are known in the art including a trackball, mouse, touch pad, joystick or special keys on alphanumeric input device 126 capable of signaling movement of a given direction or manner of displacement. Alternatively, it will be appreciated that a cursor can be directed and/or activated via input from alphanumeric input device 126 using special keys and key sequence commands. The present invention is also well suited to directing a cursor by other means such as, for example, voice commands. A more detailed discussion of the MWIO method and system embodiments of the present invention are found below.

With reference still to FIG. 2, significantly, a network interface card (NIC) 124 coupled to bus 112 is connected to a network 132 and controls the flow of information over network 132. Data packets, such as Ethernet packets, that are incoming arrive at NIC 124 via network 132 and are stored in FIFO memory 140 of NIC 124 before being transferred to other hardware and software of computer system 100. A more detailed discussion of NIC 124 in furtherance of the present invention is found below.

Figure 3:
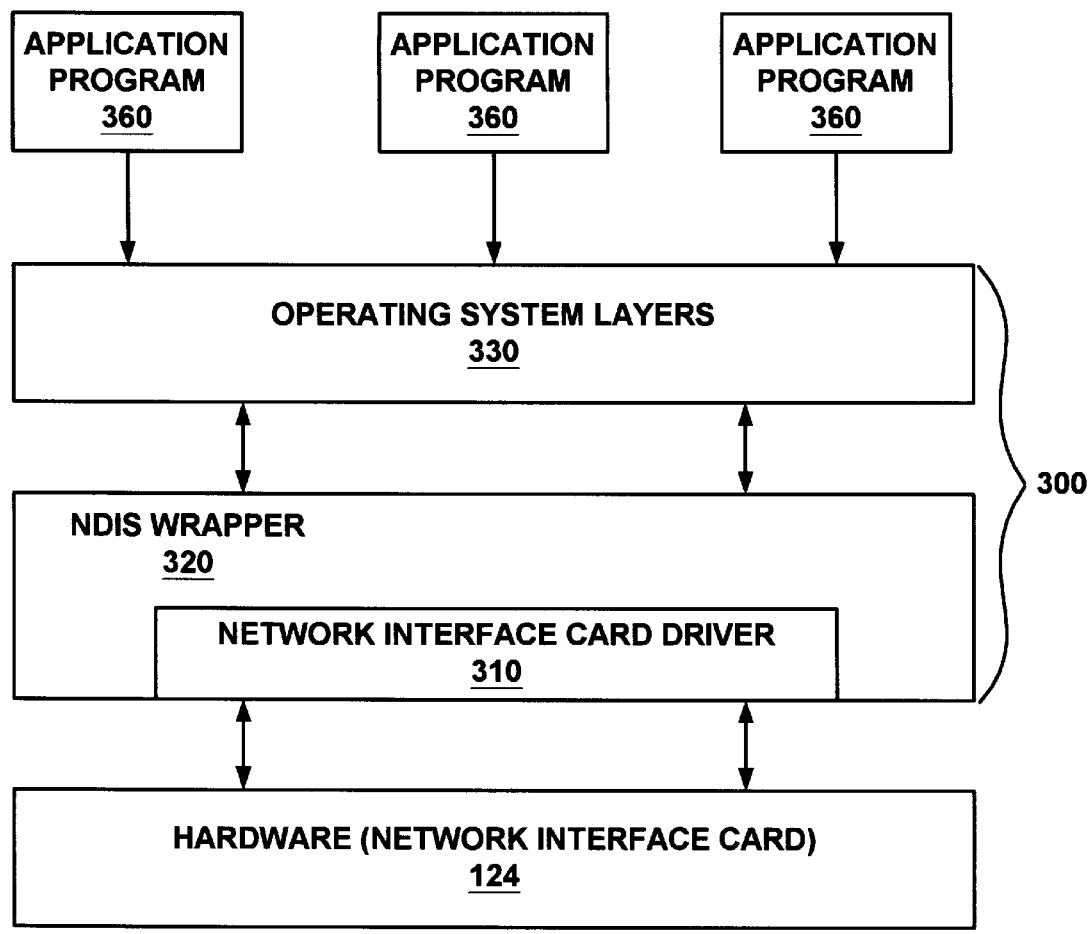
FIG. 3 is a schematic diagram of different operating layers associated with the computer system as illustrated in FIG. 2 in furtherance of one embodiment of the present invention.

Referring next to FIG. 3, a block diagram that represents the different layers of a host operating system 300 operable on computer system 100 of FIG. 2 is shown. Host operating system 300 includes a network interface card driver 310 that operates NIC 124 and moves data packets between NIC 124 and other hardware and software of computer system 100. Implemented directly above network interface card driver 310 is a network device interface specification (NDIS) wrapper 320. FIG. 3 further includes a schematic representation of operating system layers 330. NDIS wrapper 320 primarily arbitrates the control of network interface card driver 310 between various application programs, typically shown as 360.

Figure 4:
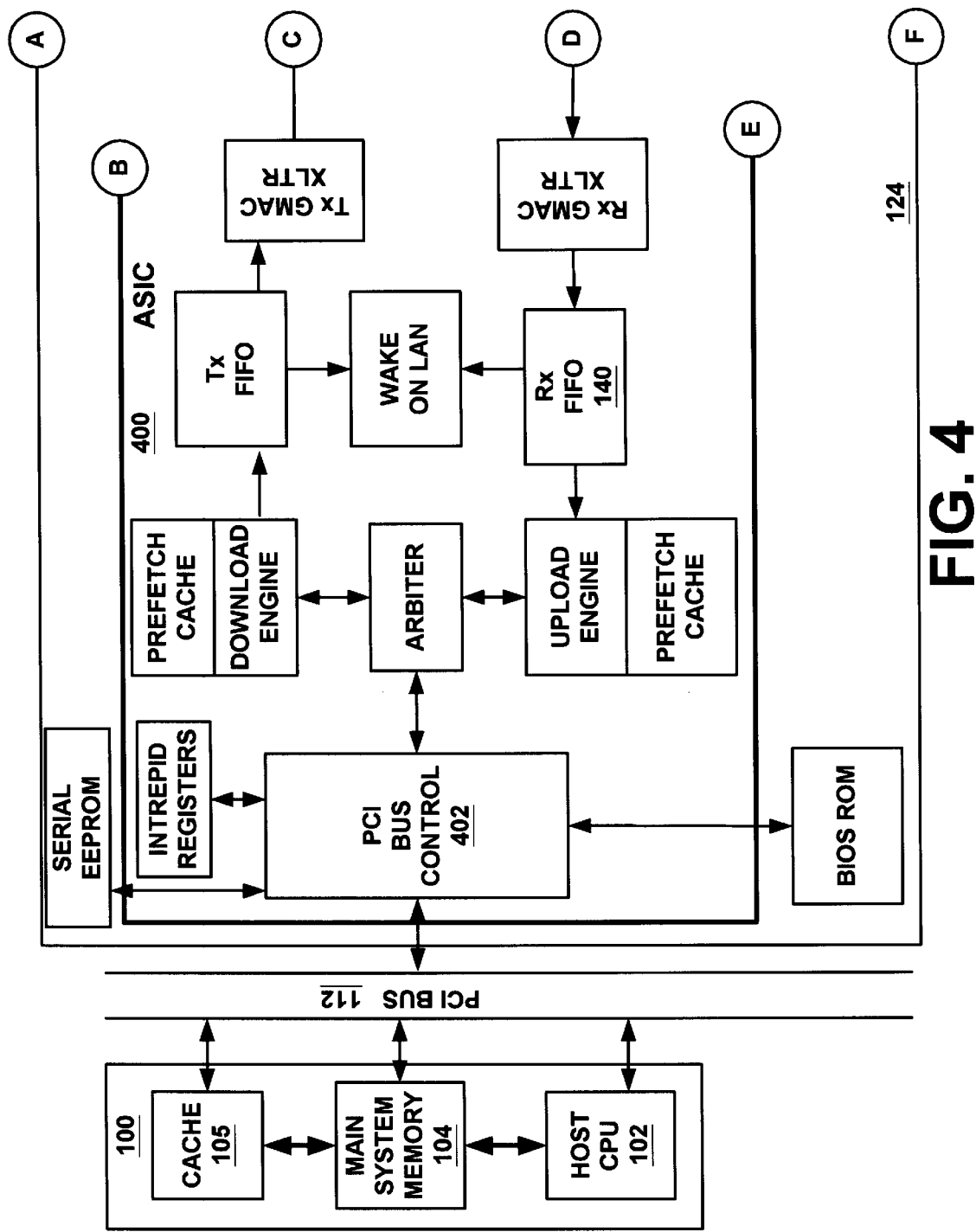
FIG. 4 is a schematic diagram of a host computer system having a network interface card coupled thereto in accordance with one embodiment of the present claimed invention.
Figure 4:
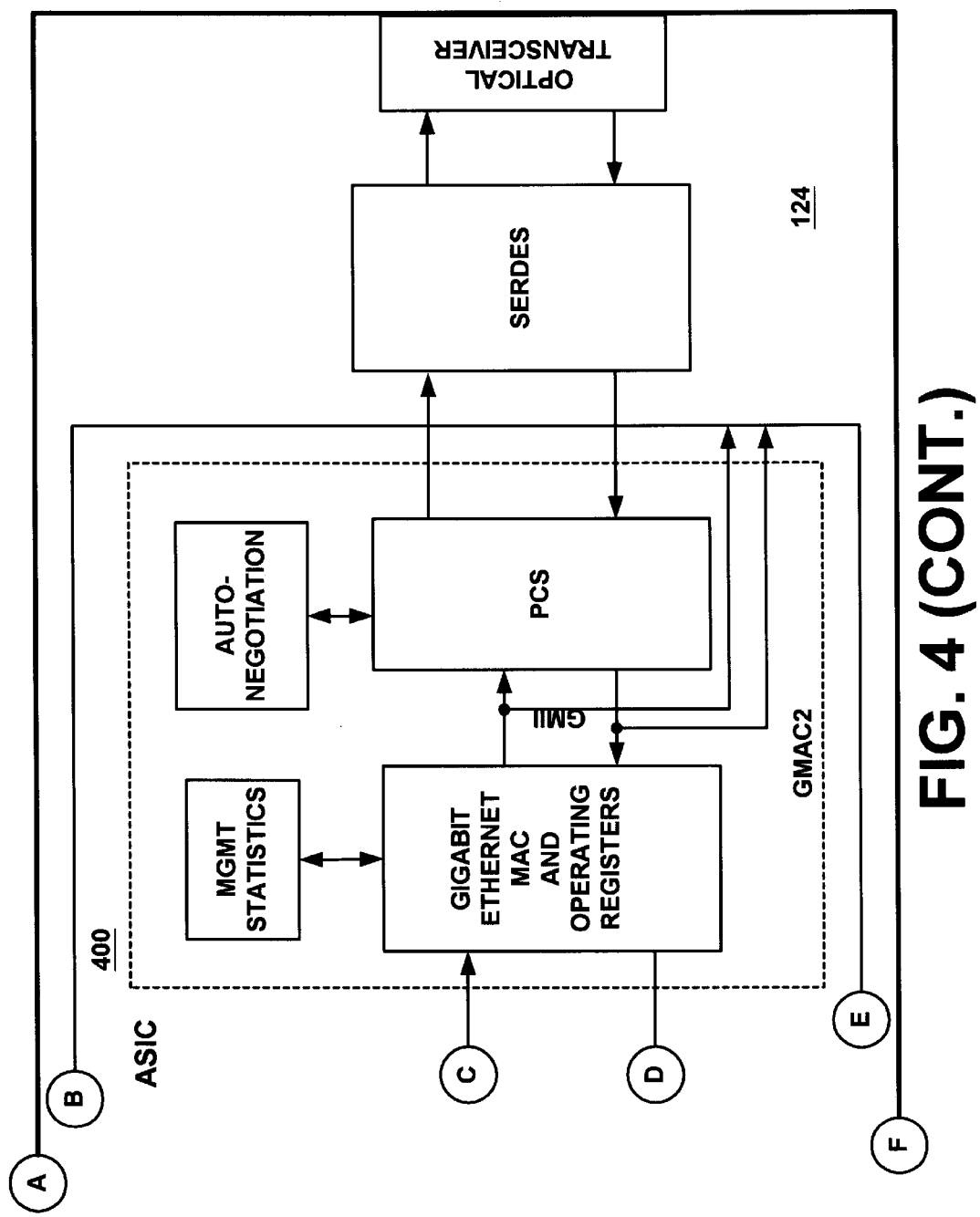

Referring now to FIG. 4, a schematic diagram of a host computer system 100 having a network interface card 124 coupled thereto is shown. In the embodiment of FIG. 4, network interface card 124 includes a network interface card ASIC (application specific integrated circuit) 400, which contains various components and features. Although such a specific implementation is shown in the embodiment of FIG. 4, the present invention is also well suited to an embodiment having various other components and features.

GENERAL DESCRIPTION OF THE PRESENT MWIO INVENTION

Figure 5:
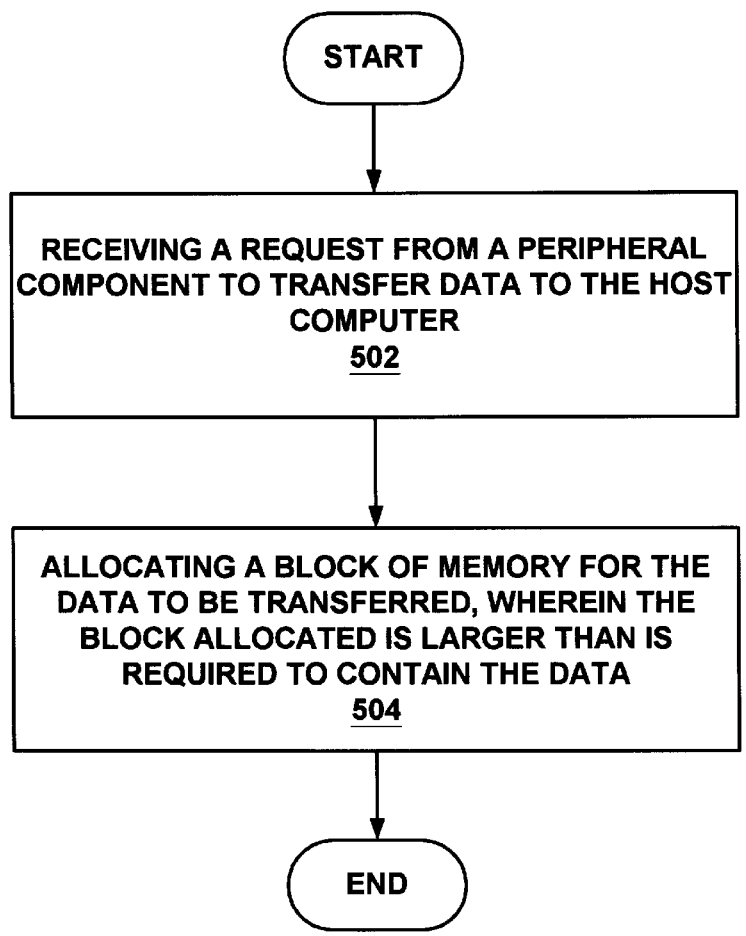
FIG. 5 is a flow chart of steps performed in one implementation of a MWIO method in accordance with one embodiment of the present claimed invention.

With reference next to FIG. 5, a flow chart 500 of exemplary steps used by the present invention is shown. Flow chart 500 includes processes of the present invention which, in one embodiment, are carried out by a processor under the control of computer-readable and computer-executable instructions. The computer-readable and computer-executable instructions reside, for example, in data storage features such as computer usable volatile memory 101 and/or computer usable non-volatile memory 103 of FIG. 2. The computer-readable and computer-executable instructions are used to control or operate in conjunction with, for example, central processing unit 102 of FIGS. 1, 2, and 4, host operating system 300, and network device driver 210 both of FIG. 2. Although specific steps are disclosed in flow chart 500 of FIG. 5, such steps are exemplary. That is, the present invention is well suited to performing various other steps or variations of the steps recited in FIG. 5.

In step 502 of FIG. 5, in one embodiment of the present invention, network interface card driver 310 of FIG. 3 receives a request to transfer data from network interface card (NIC) 124 of FIGS. 1–4 to memory of the host computer 100. In the following description of embodiments of the present invention, the peripheral component driver is a network interface card driver. Additionally, in the following description of embodiments of the present invention, the peripheral component is a network interface card which is removably coupleable to the host computer. Although the present embodiments specifically recite a network interface card and a network interface card driver, the present invention is also well suited to an embodiment employing various other peripheral components and peripheral component drivers. That is, the present invention is well suited to an embodiment in which the peripheral component is, for example, a PCMCIA (personal computer memory card international association) card and the peripheral component driver is a corresponding PCMCIA driver. Similarly, the present invention is well suited to an embodiment in which the peripheral component is, for example, a compact form factor I/O (input/output) card and the peripheral component driver is a corresponding compact form factor I/O driver. Additionally, the present invention is well suited to use in an embodiment in which the peripheral component is, for example, a rate controller, a small computer system interface (SCSI) controller, a graphics card, and the like.

With reference still to step 502 of FIG. 5, in the present embodiment, network interface card 124 transmits the request to transfer data to the memory of host computer 100 over PCI bus 112 using bus control logic 402 of FIG. 4. It will be understood that in the embodiment of FIG. 4, PCI bus control logic 402 is employed to control access to and use of PCI bus 112. Although NIC ASIC 400 is configured as shown in FIG. 4, it will be understood that the present invention is also well suited to various other configurations for NIC ASIC 400. Additionally, in the following description of the present embodiments, NIC 124 generates interrupts for and communicates with host computer 100 via PCI bus 112. Although the present embodiments specifically recite the use of a PCI bus, the present invention is also well suited to an embodiment employing various other busses. That is, the present invention is well suited to an embodiment in which the bus is, for example, a USB (universal serial bus), an ISA (industry standard architecture) bus, a SCSI (small computer systems interface) bus, an IEEE (Institute of Electronics and Electrical Engineers, Inc.) 1394 serial bus, an EISA (extended industry standard architecture) bus, and the like.

Referring still to step 502, in the present embodiment, NIC 124 transmits a request to, for example, network interface driver 310 of FIG. 3, to transfer data from NIC 124 to memory of host computer 100 of FIGS. 1 and 2. In one embodiment of the present invention, the data is comprised, for example, of data packets which have been received by NIC 124 via network 132. The present invention is, however, well suited to an embodiment in which various other data is transferred to host computer 100. In one embodiment, NIC 124 requests to transfer data to host computer 100 wherein the data will require a first block of memory in host computer 100. That is, in order to store the quantity of the data to be transferred from NIC 124 to host computer 100, a first block of memory having a first size is required.

Figure 6:
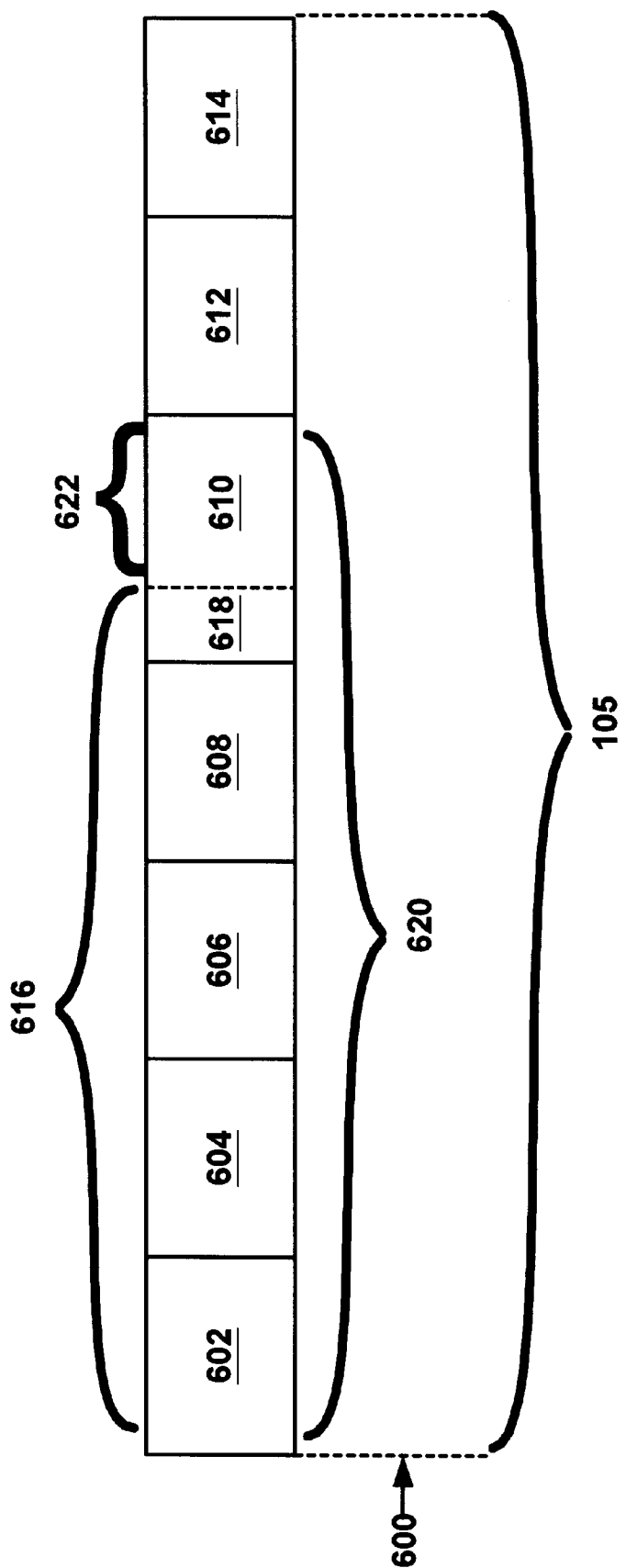
FIG. 6 is a representation of the mapping of memory spaces comprising cache memory of a host computer in accordance with one embodiment of the present claimed invention.

Referring now to FIG. 6, a physical representation of memory spaces comprising cache memory 105 of host computer 100, both of FIGS. 1, 2, and 4 is shown. As depicted in FIG. 6, cache memory 105 is comprised of discrete units 602, 604, 606, 608, 610, 612, and 614 (hereinafter units 602–614) of memory space. It will be understood, that units 602–614 comprise, for example, lines of cache memory. In the embodiment of FIG. 6, each of units 602–614 comprises 32 bytes of memory. Although such a specific representation is depicted in FIG. 6, such an arrangement is exemplary. That is, the present invention is well suited to an embodiment in which cache memory 105 has a different number of discrete units, and the present embodiment is also well suited to an embodiment in which the discrete units are comprised of a greater or lesser amount of memory space. Furthermore, although the following discussion specifically describes transferring data from NIC 124 to cache memory 105, the present invention is also well suited for use with an embodiment in which the data is to be transferred to memory other than cache memory 105.

Referring still to FIG. 6, in one embodiment, at step 502 of FIG. 5, NIC 124 requests to transfer data to host computer 100 wherein the data will occupy a first block of memory having a first size. In this embodiment, the data to be transferred will occupy a first block of memory shown as block 616. That is, in order to store the data to be transferred the entire memory (e.g. the entire cache line) of units 602, 604, 606 and 608 is required. In addition, in order to store the data to be transferred from NIC 124 requires a portion 618 of unit 610. In the embodiment of FIG. 6, portion 618 comprises 2 bytes of cache memory. Thus, in the embodiment described herein, the data to be transferred requires 130 bytes for the complete storage thereof Referring still to FIG. 6, in a conventional prior art system, because, the data to be transferred will not end at a cache boundary (i.e. the data to be transferred occupies only a portion 618 of unit 610), the data transfer can only be accomplished using a memory write and invalidate (MWI) operation when used in conjunction with the memory write (MW) operation. Thus, in order to transfer all of the data represented by 616 of FIG. 6, a conventional prior art system would have to first transfer the data which is to occupy units 602, 604, 606 and 608 using the MWI operation. After that portion of the data has been transferred, the peripheral component of a conventional prior art system would have to get off the bus. Once off the bus, a peripheral component of a conventional prior art system would then have to get back on the bus again in order to transfer the remaining data (i.e. the data occupying portion 618 of cache 105) using the MW operation. As mentioned above, such steps of getting on and off the PCI bus can introduce latency into the data transfer process.

With reference again to FIG. 5, in step 504 of the present embodiment, network interface card driver 310 of FIG. 300 allocates a second block 620 of cache memory 105 of FIG. 1 for storage of the data to be transferred from NIC 124 of FIGS. 1–4. In the present invention, second block 620 is larger in size than the first block 616 of cache memory 105 required to store the data to be transferred. Additionally, second block 620 of cache memory 105 is comprised of an integer number of cache memory units. That is, second block 620 is comprised of 5 complete memory units, 602, 604, 606, 608, and 610.

Referring still to step 504, it can be seen that the present invention "rounds up" the amount of memory required to store the data to be transferred (i.e. the first block of memory) to an amount (i.e. the second block of memory) which is larger than the required amount of memory. Furthermore, the "larger" allocated second block of memory is comprised of integer cache memory units. In the present embodiment, each of integer units 602, 604, 606, 608, and 610 comprise a line of cache memory 105. The present invention is also well suited to an embodiment in which each of the integer units is comprised of a larger or a smaller amount of memory.

With reference still to step 504 of FIG. 5, by rounding up the amount of memory allocated to the data to be transferred, the present invention achieves several substantial advantages over conventional systems. As an example, the second block 620 of memory space allocated to receive the data to be transferred is comprised of an integer number of units of cache memory 105. Therefore, the allocated memory space begins and ends on a cache boundary. As a result, the data transfer can be accomplished using a memory write and invalidate (MWI) operation. Thus, the present invention performs a memory write and invalidate overwrite (MWIO) operation which enables a data packet which ordinarily would not meet conventional requirements for use of the MWI operation to be transferred using the advantageous MWI operation. Furthermore, because the MWIO operation of the present invention allows for a MWI operation to be used, the present invention reduces CPU utilization. That is, the MWI operation invalidates all data in the allocated cache lines of block 620. Hence, the memory subsystem of host computer 100 is informed that the data in cache lines 602, 604, 606, 608, and 610 is invalid. Therefore, the memory subsystem of the host computer does not need to check and/or update those particular line of the cache. As a result, CPU utilization is reduced. As yet another advantage, all of the data can be transferred in a single MWI operation. More specifically, unlike conventional system, the present invention transfers all of the data using a single PCI bus transaction. That is, the present invention does not have to "get on", "get off", and then "get back on" the bus to complete the transfer of data. Hence, the present invention reduces the latency associated with conventional first data transfer processes.

Figure 7:
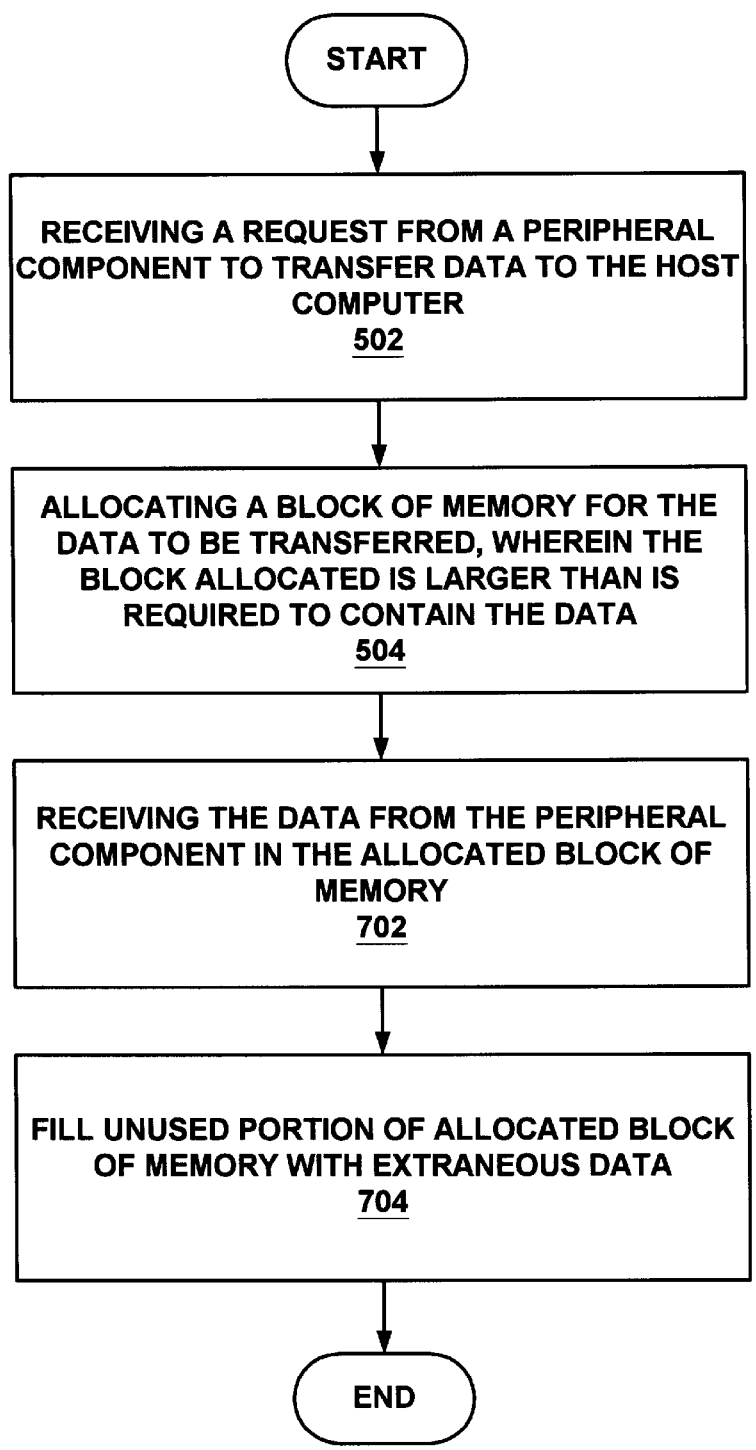
FIG. 7 is a flow chart of steps performed in another implementation of a MWIO method in accordance with one embodiment of the present claimed invention.

With reference now to FIG. 7, a flow chart 700 of exemplary steps used by the present invention is shown. The embodiment of FIG. 7 includes steps 502 and 504 described in detail above. That is, at step 502, the present embodiment first receives a request from a peripheral component to transfer data to memory of the host computer. In order to store the data to be transferred, a first block of the memory having a first size is required. At step 504, the present embodiment allocates a second block of the memory to receive the data to be transferred wherein the second block is larger than the first block, and wherein the second block is comprised of an integer unit of the memory of the host computer.

At step 702, the present embodiment receives the data to be transferred from NIC 124 of FIGS. 1–4. As described above, if stored in cache memory 105, the data will occupy a first block or portion 616 of FIG. 6. However, at step 504, the present embodiment has allocated a second block or portion 620 to receive the data to be transferred. As shown in FIG. 6, the difference between portion 620 and portion 616 is portion 622. Hence, in this embodiment, portion 622 comprises unused memory space. As stated above, each of units 602–614 is comprised of 32 bytes of memory. Additionally, in the embodiment of FIG. 6, portion 618 comprises 2 bytes of cache memory. Therefore, in this embodiment, portion 622 is comprised of 30 bytes of memory.

At step 704, the present invention fills unused memory space (e.g. portion 622) with extraneous data. That is, the MWIO operation of the present embodiment places "dummy" information in extra space obtained during the rounding up process of step 504. In one embodiment, the dummy information is comprised of zeros. The present invention, however, is well suited to storing various other extraneous or dummy information in the extra cache memory space. By filling the extra space with extraneous information, the present invention ensures that the memory subsystem of the host computer does not need to check/ update those particular bits. That is, the present MWIO operation enables the use of the advantageous MWI operation even in instances where conventional systems would have to perform a combination of MW and MWI operations. Therefore, it will be seen that the present MWIO invention minimizes CPU utilization and overhead during data transfers, maximizes bandwidth and throughput, and makes efficient use of the PCI bus.

Thus, the present invention provides a system and method which provides for a more efficient transfer of data between a peripheral component and the cache memory of a host computer system. The present invention also provides a system and method which minimizes the CPU overhead associated with data transfers between a peripheral component and the cache memory of a host computer system. The present invention further provides a system and method which reduces the latency associated with data transfers between a peripheral component and the cache memory of a host computer system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the Claims appended hereto and their equivalents.

What is claimed is:

1. A computer system comprising:
   a processor;
   an address/data bus coupled to said processor;
   a computer readable memory coupled to communicate with said processor, said processor for performing a method of efficiently transferring data between a host computer and a peripheral component removably coupled to said host computer, said method comprising the steps of:
   a) receiving a request, from said peripheral component removably coupled to said host computer, to transfer data from said peripheral component to memory of said host computer, said data requiring a first block of said memory in said host computer wherein said first block of said memory has a first size;
   b) allocating a second block of said memory in said host computer to receive said data from said peripheral component, said second block of said memory comprising an integer unit of said memory, said integer unit of said memory having a second size which is greater than said first size;
   c) receiving said data from said peripheral component in said second block of said memory; and
   d) filling extra memory space present in said second block of said memory, due to the difference in size between said first size and said second size, with extraneous data.

2. The computer system as recited in claim 1 wherein step a) of said method for efficiently transferring data between a peripheral component and a host computer further comprises receiving said request from a network interface card to transfer data from said network interface card to said memory of said host computer.

3. The computer system as recited in claim 2 wherein step a) of said method for efficiently transferring data between a peripheral component and a host computer further comprises receiving at a network interface driver said request from said network interface card to transfer data from said network interface card to said memory of said host computer.

4. The computer system as recited in claim 1 wherein step b) of said method for efficiently transferring data between a peripheral component and a host computer further comprises a peripheral component driver allocating said second block of said memory in said host computer to receive said data from said peripheral component.

5. The computer system as recited in claim 1 wherein said memory of said host computer comprises cache memory space.

6. The computer system as recited in claim 5 wherein said integer unit of said memory comprises an integer number of lines of said cache memory of said host computer.

7. A computer-usable medium having computer-readable program code embodied therein for causing a computer system to perform the steps of:
   a) receiving a request, from a peripheral component removably coupled to a host computer, to transfer data from said peripheral component to memory of a host computer, said data requiring a first block of said memory in said host computer wherein said first block of said memory has a first size;
   b) allocating a second block of said memory in said host computer to receive said data from said peripheral component, said second block of said memory comprising an integer unit of said memory, said integer unit of said memory having a second size which is greater than said first size;
   c) receiving said data from said peripheral component in said second block of said memory; and
   d) filling unused memory space present in said second block of said memory, due to the difference in size between said first size and said second size, with extraneous data.

8. The computer readable medium as described in claim 7 wherein said computer-readable program code embodied therein further causes said computer system performing step a) to perform the step of receiving said request from a network interface card to transfer said data from said network interface card to said memory of said host computer.

9. The computer readable medium as described in claim 8 wherein said computer-readable program code embodied therein further causes said computer system performing step a) to perform the step of receiving at a network interface driver said request from said network interface card to transfer said data from said network interface card to said memory of said host computer.

10. The computer readable medium as described in claim 7 wherein said computer-readable program code embodied therein further causes said computer system performing step a) to have a peripheral component driver allocate said second block of said memory in said host computer to receive said data from said peripheral component.

11. The computer readable medium as described in claim 7 wherein said computer-readable program code embodied therein further causes said computer system performing step b) to allocate a second block of cache memory in said host computer to receive said data from said peripheral component.

12. The computer readable medium as described in claim 11 wherein said computer-readable program code embodied therein further causes said computer system performing step b) to allocate an integer number of lines of said cache memory of said host computer to receive said data from said peripheral component.

13. A computer implemented method of efficiently transferring data between a host computer and a peripheral component removably coupled to said host computer, said method comprising the steps of:

a) receiving a request, from said peripheral component removably coupled to said host computer, to transfer data from said peripheral component to memory of said host computer, said data requiring a first block of said memory in said host computer wherein said first block of said memory has a first size;

b) allocating a second block of said memory in said host computer to receive said data from said peripheral component, said second block of said memory comprising an integer unit of said memory, said integer unit of said memory having a second size which is greater than said first size;

c) receiving said data from said peripheral component in said second block of said memory; and d) filling unused memory space present in said second block of said memory, due to the difference in size between said first size and said second size, with extraneous data.

14. The computer implemented method as recited in claim 13 wherein step a) of said method for efficiently transferring data between a peripheral component and a host computer further comprises receiving said request from a network interface card to transfer data from said network interface card to said memory of said host computer.

15. The computer implemented method as recited in claim 14 wherein step a) of said method for efficiently transferring data between a peripheral component and a host computer further comprises receiving at a network interface driver said request from said network interface card to transfer data from said network interface card to said memory of said host computer.

16. The computer implemented method as recited in claim 13 wherein step b) of said method for efficiently transferring data between a peripheral component and a host computer further comprises a peripheral component driver allocating said second block of said memory in said host computer to receive said data from said peripheral component.

17. The computer implemented method as recited in claim 13 wherein said memory of said host computer comprises cache memory space.

18. The computer implemented method as recited in claim 17 wherein step b) further comprises allocating an integer number of lines of said cache memory of said host computer to receive said data from said peripheral component.

* * * * *